(12) United States Patent
Kogure

(10) Patent No.: US 10,697,605 B2
(45) Date of Patent: Jun. 30, 2020

(54) LIGHTING TOOL FOR VEHICLE

(71) Applicant: STANLEY ELECTRIC CO., LTD., Meguro-ku, Tokyo (JP)

(72) Inventor: Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/280,767

(22) Filed: Feb. 20, 2019

(65) Prior Publication Data

US 2019/0271448 A1 Sep. 5, 2019

(30) Foreign Application Priority Data

Mar. 5, 2018 (JP) .................... 2018-038247

(51) Int. Cl.
| | | |
|---|---|---|
| *F21S 41/275* | (2018.01) | |
| *F21S 41/135* | (2018.01) | |
| *F21S 41/36* | (2018.01) | |
| *F21S 41/64* | (2018.01) | |
| *B60Q 1/08* | (2006.01) | |

(Continued)

(52) U.S. Cl.
CPC ............ *F21S 41/275* (2018.01); *B60Q 1/085* (2013.01); *F21S 41/135* (2018.01); *F21S 41/285* (2018.01); *F21S 41/321* (2018.01); *F21S 41/36* (2018.01); *F21S 41/635* (2018.01); *F21S 41/645* (2018.01); *G02B 27/283* (2013.01);
(Continued)

(58) Field of Classification Search
CPC ...... F21S 41/275; F21S 41/285; F21S 41/635; F21S 41/321; F21S 41/645; F21S 41/36; F21S 41/135; F21S 41/40; G02B 27/283; B60Q 1/085; B60Q 2300/32; F21Y 2115/10

See application file for complete search history.

(56) References Cited

U.S. PATENT DOCUMENTS

| | | | | |
|---|---|---|---|---|
| 5,113,319 A | * | 5/1992 | Sekiguchi | .............. B60Q 1/076 362/466 |
| 5,579,138 A | * | 11/1996 | Sannohe | .............. G02B 27/283 348/E9.027 |

(Continued)

FOREIGN PATENT DOCUMENTS

| | | | |
|---|---|---|---|
| DE | 102006059064 A1 * | 6/2008 | ........... B60Q 1/1423 |
| DE | 102006059064 A1 | 6/2008 | |

(Continued)

OTHER PUBLICATIONS

Extended European Search Report (EESR) dated Aug. 6, 2019 issued in European Application No. 19160001.4.

*Primary Examiner* — Donald L Raleigh
(74) *Attorney, Agent, or Firm* — Holz, Holtz & Volek PC

(57) ABSTRACT

A lighting tool for a vehicle includes a first condensing optical system configured to condense a first beam at a first condensing magnification, a second condensing optical system configured to condense a second beam at a second condensing magnification, and a projection optical system configured to project the first beam and the second beam forward, wherein each of a condensing point of the first beam condensed by the first condensing optical system and a condensing point of the second beam condensed by the second condensing optical system are adjusted according to a rear-side focus of the projection optical system.

18 Claims, 6 Drawing Sheets

(51) Int. Cl.
*G02B 27/28* (2006.01)
*F21S 41/32* (2018.01)
*F21S 41/63* (2018.01)
*F21S 41/20* (2018.01)
*F21Y 115/10* (2016.01)
*F21S 41/40* (2018.01)

(52) U.S. Cl.
CPC ........... *B60Q 2300/32* (2013.01); *F21S 41/40* (2018.01); *F21Y 2115/10* (2016.08)

(56) References Cited

U.S. PATENT DOCUMENTS

| | | |
|---|---|---|
| 2015/0292705 A1 | 10/2015 | Thullier et al. |
| 2017/0276980 A1 | 9/2017 | Kauschke et al. |
| 2018/0120686 A1 | 5/2018 | Hayashi et al. |

FOREIGN PATENT DOCUMENTS

| | | |
|---|---|---|
| DE | 102014113700 A1 | 3/2016 |
| DE | 102015115339 A1 | 3/2017 |
| DE | 102015221049 A1 | 5/2017 |
| JP | H09160126 A | 6/1997 |
| JP | 2017212210 A | 11/2017 |
| WO | 2016170737 A1 | 10/2016 |
| WO | 2019031160 A1 | 2/2019 |

\* cited by examiner

LIGHTING TOOL FOR VEHICLE

CROSS-REFERENCE TO RELATED APPLICATION

Priority is claimed on Japanese Patent Application No. 2018-038247, filed Mar. 5, 2018, the content of which is incorporated herein by reference.

BACKGROUND

Field of the Invention

The present invention relates to a lighting tool for a vehicle.

Description of Related Art

For example, a lighting tool for a vehicle such as a headlight (headlamp) for a vehicle or the like includes a light source, a reflector configured to reflect light emitted from the light source in a direction of advance of a vehicle, a shade configured to block (cut) some of the light reflected by the reflector, and a projection lens configured to project light, some of which is cut by the shade, in a direction of advance of a vehicle.

In such a lighting tool for a vehicle, as a passing beam (a low beam), a light distribution pattern for a low beam including a cutoff line at an upper end thereof is formed by reversing and projecting a light source image defined by a front end of the shade by using the projection lens.

In addition, in the lighting tool for a vehicle, by disposing another light source configured to emit light in a direction of advance of a vehicle at below the shade and by projecting light emitted from the light source by the projection lens as a traveling beam (a high beam), a light distribution pattern for a high beam is formed above the light distribution pattern for a low beam.

Further, in recent years, development of a light distribution variable headlamp (adaptive driving beam: ADB) configured to variably control a light distribution of a light distribution pattern for a high beam is in progress. The ADB is technology for recognizing a preceding vehicle, an oncoming vehicle, a pedestrian, or the like, using an on-vehicle camera and enlarging a forward field of vision of a driver at nighttime by blocking light that gives glare to a driver or a pedestrian in front of the vehicle.

Incidentally, a light source unit that forms the above-mentioned light distribution pattern for a low beam and a light source unit that forms the above-mentioned light distribution pattern for a high beam are configured as separate bodies from each other because light emission directions thereof are different from each other.

Here, since reduction in costs due to saving of the number of parts and simplification of an assembly process is achieved, development of a lighting tool for a vehicle in which these light source units are integrated (modularized) is in progress (for example, see Japanese Unexamined Patent Application, First Publication No. 2017-212210).

For example, Japanese Unexamined Patent Application, First Publication No. 2017-212210 discloses a headlight for an automobile (10) including a light source (20), a polarization beam splitter (30) provided in an optical path of the light source (20) that is divided into two partial optical paths (S1, S2), which are polarized such that light emitted from the light source (20) are different from each other, a first liquid crystal mask (40) provided in the first partial optical path (S1), a first polarization filter (50), a first lens (60), a second liquid crystal mask (42) provided in the second partial optical path (S2), a second polarization filter (52) and a second lens (62), wherein the first lens in the first partial optical path (S1) has a focal distance f1 different from that of the second lens (62) in the second partial optical path (S2).

SUMMARY OF THE INVENTION

However, in such a configuration, the separate liquid crystal masks (40, 42), polarization filters (50, 52), and lenses (60, 62) should be provided along the two partial optical paths (S1, S2), which are polarized, and the entire module is increased in size. In addition, design properties or manufacturing costs are also deteriorated.

An aspect of the present invention is directed to providing a lighting tool for a vehicle capable of reduction in size by achieving modularization as a whole.

In order to accomplish the above-mentioned object, the present invention provides the following means.

[1] A lighting tool for a vehicle including:
a first condensing optical system configured to condense a first beam at a first condensing magnification;
a second condensing optical system configured to condense a second beam at a second condensing magnification; and
a projection optical system configured to project the first beam and the second beam forward,
wherein each of a condensing point of the first beam condensed by the first condensing optical system and a condensing point of the second beam condensed by the second condensing optical system are adjusted according to a rear-side focus of the projection optical system.

[2] The lighting tool for a vehicle according to [1], wherein the first condensing optical system is a first reflector configured to reflect the first beam while condensing the first beam, and
the second condensing optical system is a second reflector configured to reflect the second beam while condensing the second beam.

[3] The lighting tool for a vehicle according to [2], wherein the first reflector has a first elliptical reflecting surface,
the second reflector has a second elliptical reflecting surface,
a third condensing optical system configured to condense the first beam toward a first focus of the first elliptical reflecting surface and to condense the second beam toward a first focus of the second elliptical reflecting surface is provided,
the condensing point of the first beam is disposed at a second focus of the first elliptical reflecting surface and the condensing point of the second beam is disposed at a second focus of the second elliptical reflecting surface, and
the second focus of the first elliptical reflecting surface and the second focus of the second elliptical reflecting surface coincide with each other.

[4] The lighting tool for a vehicle according to any one of [1] to [3], including:
a light source; and
a beam separation element configured to split light emitted from the light source into the first beam and the second beam.

[5] The lighting tool for a vehicle according to [4], wherein the beam separation element is a polarization beam splitter.

[6] The lighting tool for a vehicle according to [5], including a 1/2 wavelength plate disposed in an optical path between the polarization beam splitter and the second condensing optical system and configured to convert the second beam into light of a same polarization state as the first beam.

[7] The lighting tool for a vehicle according to any one of [1] to [6], including an image forming element disposed according to the rear-side focus of the projection optical system and configured to form an image of light projected by the projection optical system.

[8] The lighting tool for a vehicle according to any one of [1] to [7], including a shade configured to block some of the first beam condensed by the first condensing optical system, wherein a light distribution pattern for a low beam including a cutoff line on an upper end thereof is formed with the projection optical system by inversely projecting an image of light defined by a front end of the shade.

[9] The lighting tool for a vehicle according to [7], including a shade configured to block some of the first beam condensed by the first condensing optical system, wherein a gap is provided between a front end of the shade and the image forming element, and a light distribution pattern for a low beam including a cutoff line on an upper end thereof is formed with the projection optical system by inversely projecting an image of light formed by the image forming element.

[10] The lighting tool for a vehicle according to [8] or [9], wherein, among the light projected from the projection optical system toward a road surface, the first beam has more light components of P polarization than light components of S polarization with respect to the road surface.

[11] The lighting tool for a vehicle according to any one of [5] to [10], including a polarization conversion element disposed in an optical path between the light source and the polarization beam splitter and configured to convert a polarization state of light emitted from the light source, wherein a proportion of the first beam and the second beam split by the polarization beam splitter is adjusted according to a polarization state of light converted by the polarization conversion element.

[12] The lighting tool for a vehicle according to [11], wherein the polarization conversion element is a variable polarization conversion element configured to variably control a polarization state of light emitted from the light source, and a proportion of the first beam and the second beam split by the polarization beam splitter is variably adjusted according to a polarization state of light converted by the variable polarization conversion element.

As described above, according to the aspect of the present invention, it is possible to provide a lighting tool for a vehicle which is capable of reduction in size by achieving modularization of the entire lighting tool.

DETAILED DESCRIPTION OF THE INVENTION

Figure 1:
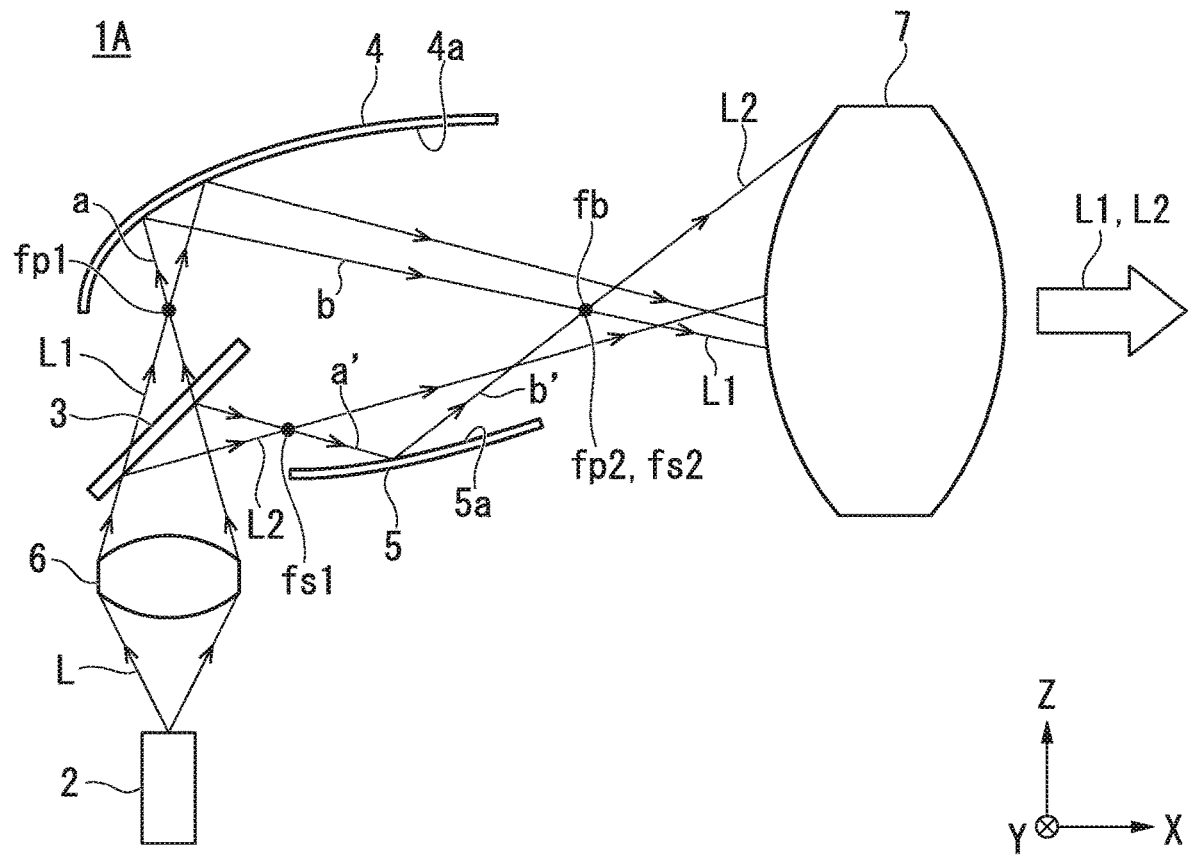
FIG. 1 is a schematic view showing a schematic configuration of a lighting tool for a vehicle according to a first embodiment of the present invention.

Hereinafter, embodiments of the present invention will be described with reference to the accompanying drawings.

Further, in the drawings used for the following description, for the purpose of understanding each component, scales of dimensions are differently shown according to the components, and dimensional ratios of the components are not limited to being the same as actual ones.

In addition, in the drawings as described below, an XYZ orthogonal coordinate system is set, an X-axis direction represents a forward/rearward direction (a lengthwise direction) of a lighting tool for a vehicle, a Y-axis direction represents a leftward/rightward direction (a widthwise direction) of the lighting tool for a vehicle, and a Z-axis direction represents an upward/downward direction (a height direction) of the lighting tool for a vehicle.

In addition, in the following description, directions of forward, rearward, leftward, rightward, upward and downward, in the following description are the same as directions when a lighting tool for a vehicle is seen from a front surface (a side in front of a vehicle) unless the context clearly indicates otherwise.

First Embodiment

First, as a first embodiment of the present invention, for example, a lighting tool 1A for a vehicle shown in FIG. 1 will be described. Further, FIG. 1 is a schematic view showing a schematic configuration of the lighting tool 1A for a vehicle.

The lighting tool 1A for a vehicle of the embodiment is obtained by applying the present invention to, for example, headlights (headlamps) for a vehicle mounted on both corner sections of a front end side of a vehicle (not shown).

Specifically, as shown in FIG. 1, the lighting tool 1A for a vehicle generally includes a light source 2, a beam separation element 3, a first condensing optical system 4, a second condensing optical system 5, a third condensing optical system 6, and a projection optical system 7.

The light source 2 is configured to emit unpolarized (non-polarized) light L. In the embodiment, an LED module having a light emitting diode (LED) mounted in a package is used. In addition, an LED configured to emit white light is used in the LED module. Further, a high output type LED for vehicle illumination is used as the LED. The light source 2 radially emits light L upward (in a +Z-axis direction)

Further, a light emitting element such as a laser diode (LD) or the like, which will be described below, in addition to the above-mentioned LED, may be used in the light source 2. In addition, a light source other than the above-mentioned light emitting element may be used. Further, the number of the light emitting elements is not limited to one and may be plural.

The beam separation element 3 is configured to split light L emitted from the light source 2 into a first beam L1 and a second beam L2. In the embodiment, a polarization beam splitter (hereinafter, referred to as a polarization beam splitter 3) is used as the beam separation element 3. The polarization beam splitter 3 causes the first beam L1 that becomes P polarization, among light L emitted from the light source 2, to penetrate upward (in the (+Z-axis direction)) therethrough and reflects the second beam L2 that becomes S polarization forward (in the (+X-axis direction)). Further, the polarization beam splitter 3 is not limited to a plate type having a flat plate shape as shown in FIG. 1 and may be a cube type in which two rectangular prisms are combined.

The first condensing optical system 4 is configured to condense the first beam L1 toward the projection optical system 7 at a first condensing magnification. In the embodiment, a first reflector (hereinafter, referred to as a first reflector 4) configured to reflect the first beam L1 while condensing the first beam L1 is used as the first condensing optical system 4.

The first reflector 4 has a first elliptical reflecting surface 4a having a concave surface shape, a cross-sectional shape of which is formed to draw an elliptical line. The first elliptical reflecting surface 4a hold two focuses fp1 and fp2 and condenses the first beam L1 that passes through the first focus fp1 to the second focus fp2 at a first condensing magnification. The first reflector 4 is disposed such that the first focus fp1 of the first elliptical reflecting surface 4a is directed to a side to which the first beam L1 enters.

Here, provided that a first condensing magnification is represented by M1, a distance from the first focus fp1 to the first elliptical reflecting surface 4a is represented by a, and a distance from the first elliptical reflecting surface 4a to the second focus fp2 is represented by b, a first condensing magnification M1 is expressed by the following equation (1).

$$M1 = b/a \text{ (however, } b > a\text{)} \qquad (1)$$

The second condensing optical system 5 is configured to condense the second beam L2 toward the projection optical system 7 at a second condensing magnification. In the embodiment, a second reflector (hereinafter, referred to as a second reflector 5) configured to reflect the second beam L2 while condensing the second beam L2 is used as the second condensing optical system 5.

The second reflector 5 has a second elliptical reflecting surface 5a having a concave surface shape, a cross-sectional shape of which is formed to draw an elliptical line. The second elliptical reflecting surface 5a hold two focuses fs1 and fs2 and condenses the second beam L2 that passes through the first focus fs1 to the second focus fs2 at a second condensing magnification. The second reflector 5 is disposed such that the first focus fs1 of the second elliptical reflecting surface 5a is directed toward a side to which the second beam L2 enters.

Here, provided that a second condensing magnification is represented as M2, a distance from the first focus fs1 to the second elliptical reflecting surface 5a is represented as a', and a distance from the second elliptical reflecting surface 5a to the second focus fs2 is represented as b', a second condensing magnification M2 is expressed as the following equation (2).

$$M2 = b'/a' \text{ (however, } b' > a'\text{)} \qquad (2)$$

In the lighting tool 1A for a vehicle of the embodiment, the first reflector 4 disposed at an upper side (in the +Z-axis direction) and the second reflector 5 disposed at a lower side (in the −Z-axis direction) are disposed in a state in which elliptical reflecting surfaces 4a and 5a thereof face each other. In addition, in the lighting tool 1A for a vehicle of the embodiment, the first condensing magnification M1 is set to be larger than the second condensing magnification M2 (M1>M2).

The third condensing optical system 6 is constituted by at least one or a plurality of (in the embodiment, one) lens (hereinafter, referred to as a condensing lens 6) disposed in an optical path between the light source 2 and the polarization beam splitter 3. The condensing lens 6 condenses the first beam L1 toward the first focus fp1 of the first elliptical reflecting surface 4a and condenses the second beam L2 toward the first focus fs1 of the second elliptical reflecting surface 5a.

Accordingly, a condensing point of the first beam L1 condensed by the first reflector 4 is disposed at the second focus fp2 of the first elliptical reflecting surface 4a. In addition, a condensing point of the second beam L2 condensed by the second reflector 5 is disposed at the second focus fs2 of the second elliptical reflecting surface 5a.

In the lighting tool 1A for a vehicle of the embodiment, the second focus fp2 of the first elliptical reflecting surface 4a and the second focus fs2 of the second elliptical reflecting surface 5a coincide with each other. In addition, the second focuses fp2 and fs2 of the first and second elliptical reflecting surfaces 4a and 5a are disposed at a rear-side focus fb of the projection optical system 7 or in the vicinity thereof.

The projection optical system 7 is constituted by at least one or a plurality of (in the embodiment, one) lenses (hereinafter, referred to as a projection lens 7) disposed in front of the first reflector 4 and the second reflector 5. The projection lens 7 projects the first beam L1 and the second beam L2 condensed by the first reflector 4 and the second reflector 5 forward.

Figure 2:
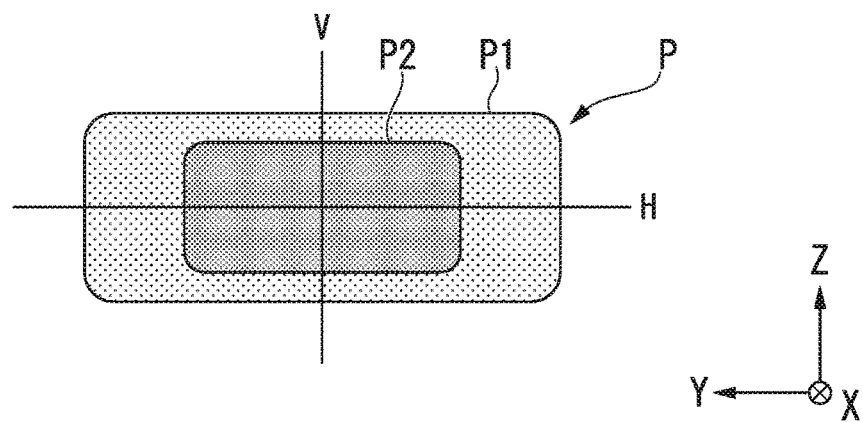
FIG. 2 is a schematic view showing a light distribution pattern formed on a surface of a virtual vertical screen by a first beam and a second beam in the lighting tool for a vehicle shown in FIG. 1.

In the lighting tool 1A for a vehicle having the above-mentioned configuration, FIG. 2 shows a first light distribution pattern P1 due to the first beam L1 and a second light distribution pattern P2 due to the second beam L2 when the first beam L1 and the second beam L2 are radiated toward a side in front of the projection lens 7 with respect to a virtual vertical screen that faces the projection lens 7.

Further, FIG. 2 is a schematic view showing the first light distribution pattern P1 and the second light distribution pattern P2 formed on a surface of the virtual vertical screen by the first beam L1 and the second beam L2 in the lighting tool 1A for a vehicle of the embodiment.

In the lighting tool 1A for a vehicle of the embodiment, each of a condensing point of the first beam L1 condensed by the first reflector (the first condensing optical system) 4 and a condensing point of the second beam L2 condensed by the second reflector (the second condensing optical system) 5 is adjusted according to the rear-side focus fb of the projection lens 7.

That is, in the lighting tool 1A for a vehicle of the embodiment, in a state in which the second focus fp2 of the first elliptical reflecting surface 4a and the second focus fs2 of the second elliptical reflecting surface 5a coincide with each other, the second focuses fp2 and fs2 are disposed at the rear-side focus fb of the projection lens 7 or in the vicinity thereof.

Accordingly, the first beam L1 projected forward from the projection lens 7 forms the first light distribution pattern P1 according to the first condensing magnification M1. Meanwhile, the second beam L2 projected forward from the projection lens 7 forms the second light distribution pattern P2 according to the second condensing magnification M2.

Here, in the embodiment, the first condensing magnification M1 is larger than the second condensing magnification M2 (M1>M2). Accordingly, a light distribution pattern P, on which the second light distribution pattern P2 projected toward a relatively narrow range is superimposed, is formed inside the first light distribution pattern P1 projected toward a relatively wide range by the first and second beams L1 and L2 projected forward from the projection lens 7.

Accordingly, in the lighting tool 1A for a vehicle of the embodiment, illuminance of light radiated to the vicinity of a center of the irradiation range can be increased while widening the irradiation range, and the light distribution pattern P appropriate for the headlight for a vehicle can be obtained.

As described above, the lighting tool 1A for a vehicle of the embodiment includes the first reflector 4 configured to condense the first beam L1 at the first condensing magnification M1, the second reflector 5 configured to condense the second beam L2 at the second condensing magnification M2, and the projection lens 7 configured to project the first beam L1 and the second beam L2 forward, wherein each of a condensing point of the first beam L1 condensed by the first reflector 4 and condensing point of the second beam L2 condensed by the second reflector 5 is adjusted to be disposed on the rear-side focus fb of the projection lens 7 or in the vicinity thereof.

Accordingly, in the lighting tool 1A for a vehicle of the embodiment, the first beam L1 condensed by the first reflector 4 and the second beam L2 condensed by the second reflector 5 can be projected forward by the common projection lens 7. Furthermore, reduction in size of the lighting tool 1A for a vehicle can be achieved by modularizing the first reflector 4, the second reflector 5 and the projection lens 7.

In addition, in the lighting tool 1A for a vehicle of the embodiment, visibility in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1A for a vehicle of the embodiment, by splitting light L emitted from the light source 2 into the first beam L1 and the second beam L2 through the above-mentioned polarization beam splitter (the beam separation element) 3 and using it, further reduction in size of the lighting tool 1A for a vehicle can be obtained without increasing the number of the light sources 2.

Second Embodiment

Figure 3:
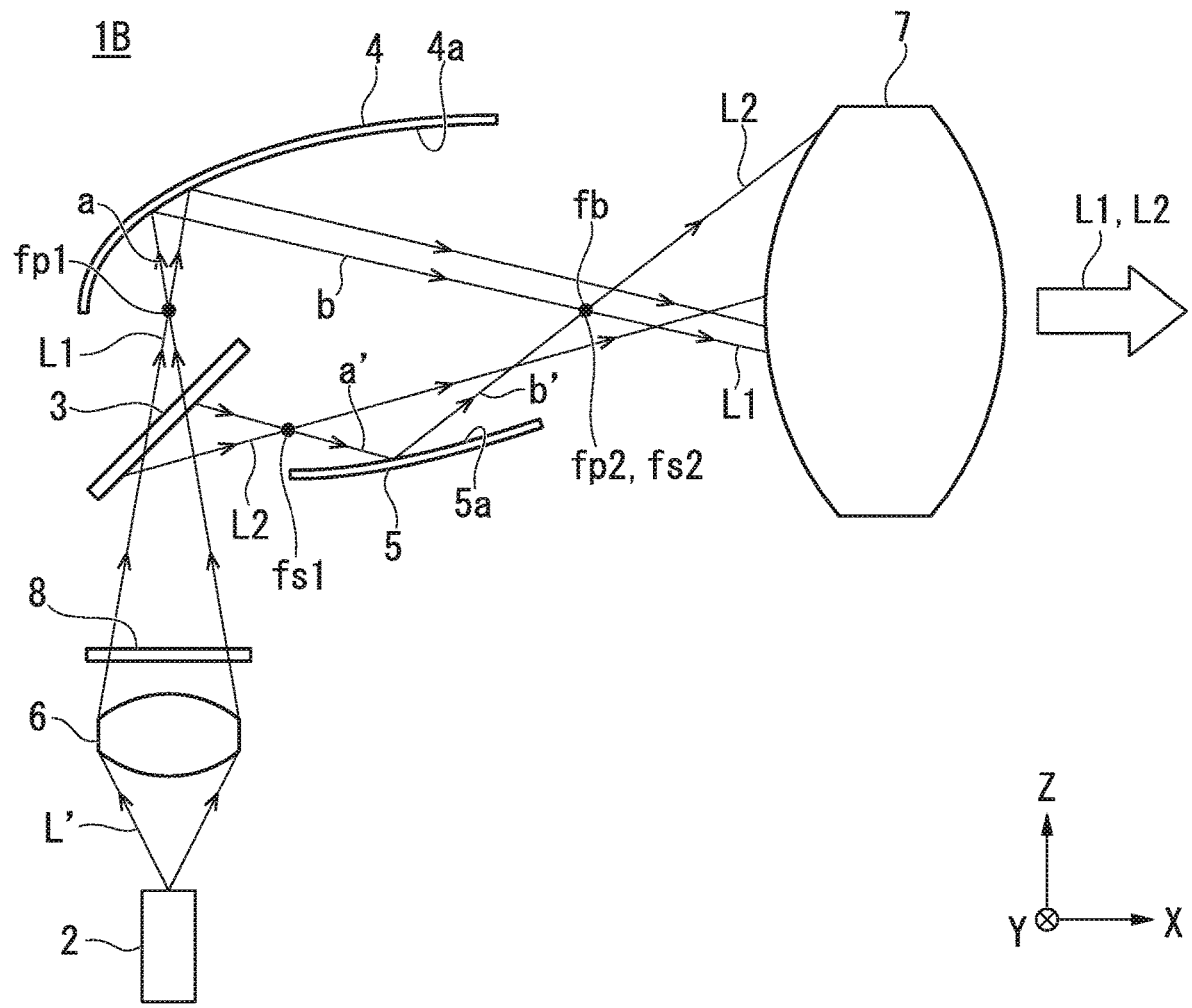
FIG. 3 is a schematic view showing a schematic configuration of a lighting tool for a vehicle according to a second embodiment of the present invention.

Next, for example, a lighting tool 1B for a vehicle shown in FIG. 3 will be described as a second embodiment of the present invention. Further, FIG. 3 is a schematic view showing a schematic configuration of the lighting tool 1B for a vehicle. In addition, in the following description, the same components as the lighting tool 1A for a vehicle, descriptions of which are omitted, are designated by the same reference numerals in the drawings.

As shown in FIG. 3, the lighting tool 1B for a vehicle of the embodiment includes a polarization conversion element 8 configured to convert a polarization state of light L' emitted from the light source 2, in addition to the configuration of the lighting tool 1A for a vehicle.

Specifically, in the lighting tool 1B for a vehicle, a polarization light source configured to emit polarized light L' is used as the light source 2. For example, an LD or the like configured to emit a laser beam may be used as the polarization light source. In addition, the above-mentioned polarized light L' may be emitted using a combination of the light source 2 configured to emit the unpolarized light L and a polarization plate as the polarization light source.

The polarization conversion element 8 is disposed in the middle of the optical path between the light source 2 and the polarization beam splitter 3. For example, a phase difference plate (an optical compensation plate) such as a λ/2 plate, a ¼ wavelength plate (a λ/4 plate), a liquid crystal film, or the like, may be used as the polarization conversion element 8. A polarization state of light L' emitted from the light source 2 can be converted into the polarized light L', which is referred to as linear polarization, circular polarization or elliptical polarization that is different from before conversion, using the polarization conversion element 8.

In the lighting tool 1B for a vehicle of the embodiment, proportions of the first beam L1 and the second beam L2 divided by the polarization beam splitter 3 are adjusted according to the polarization state of the light L' converted by the polarization conversion element 8.

That is, in the polarization conversion element 8, proportions of the light (the first beam L1) oscillated in a direction in which the polarization beam splitter 3 passes and the light (the second beam L2) oscillated in a direction in which the light is reflected by the polarization beam splitter 3 can be adjusted by changing a polarization state of a vibration direction or the like of the light L' emitted from the light source 2.

For example, when the linear polarization light L' emitted from the light source 2 is converted into circular polarization light by the polarization conversion element 8, proportions of the first beam L1 and the second beam L2 divided by the polarization beam splitter 3 are equal to each other. Meanwhile, when the linear polarization light L' emitted from the light source 2 is converted into elliptical polarization light by the polarization conversion element 8, proportions of the first beam L1 and the second beam L2 divided by the polarization beam splitter 3 are different from each other according to an inclination angle of the elliptical polarization. Meanwhile, when the linear polarization light L' emitted from the light source 2 is converted into linear polarization light that is reversed from before conversion by the polarization conversion element 8, any one of the first beam L1 and the second beam L2 can be transmitted through or reflected by the polarization beam splitter 3.

In addition, a variable polarization conversion element (hereinafter, a variable polarization conversion element 8) configured to variably control a polarization state of light L' emitted from the light source 2 may be used as the polarization conversion element 8. For example, a liquid crystal element, a Faraday element, or the like, configured to variably convert a polarization state of light L' emitted from the light source 2 through electrical control may be used as the variable polarization conversion element 8. In addition, the variable polarization conversion element 8 may be configured to variably convert a polarization state of light L' emitted from the light source 2 by changing an orientation with respect to a vibration direction of light L' of the above-mentioned phase difference plate (optical compensation plate) through mechanical driving.

In the lighting tool 1B for a vehicle of the embodiment, proportions of the first beam L1 and the second beam L2 divided by the polarization beam splitter 3 can be variably adjusted according to a polarization state of light L' converted by the above-mentioned variable polarization conversion element 8.

Figure 4:
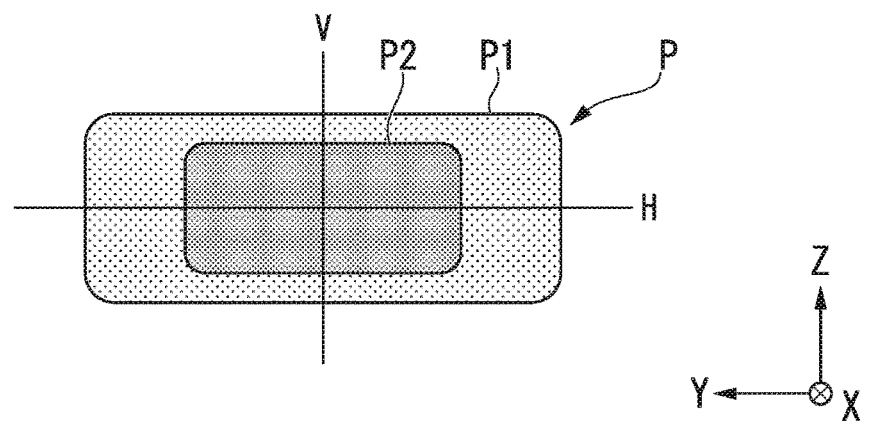
FIG. 4 is a schematic view showing a light distribution pattern formed on a surface of a virtual vertical screen by a first beam and a second beam in the lighting tool for a vehicle shown in FIG. 3.

In the lighting tool 1B for a vehicle having the above-mentioned configuration, the first light distribution pattern P1 due to the first beam L1 and the second light distribution pattern P2 due to the second beam L2 when the first beam L1 and the second beam L2 radiated to a side in front of the projection lens 7 is projected to the virtual vertical screen facing the projection lens 7 are shown in FIG. 4.

Further, FIG. 4 is a schematic view showing the first light distribution pattern P1 and the second light distribution pattern P2 formed on a surface of the virtual vertical screen by the first beam L1 and the second beam L2 in the lighting tool 1B for a vehicle of the embodiment.

In the lighting tool 1B for a vehicle of the embodiment, like the lighting tool 1A for a vehicle, the first light distribution pattern P1 according to the first condensing magnification M1 is formed by the first beam L1 projected forward from the projection lens 7. Meanwhile, the second light distribution pattern P2 according to the second condensing magnification M2 is formed by the second beam L2 projected forward from the projection lens 7. Accordingly, the light distribution pattern P in which the second light distribution pattern P2 projected toward a relatively narrow range is superimposed on an inner side of the first light distribution pattern P1 projected toward a relatively wide range is formed.

Accordingly, in the lighting tool 1B for a vehicle of the embodiment, like the lighting tool 1A for a vehicle, illuminance of light radiated to the vicinity of the center of the irradiation range can be increased while widening the irradiation range, and the light distribution pattern P appropriate for the headlight for a vehicle can be obtained.

In addition, in the lighting tool 1B for a vehicle of the embodiment, proportions of the first beam L1 and the second beam L2 divided by the polarization beam splitter 3 can be adjusted according to a polarization state of light L' converted by the above-mentioned polarization conversion element 8. Accordingly, illuminance of the first light distribution pattern P1 formed by the first beam L1 and illuminance of the second light distribution pattern P2 formed by the second beam L2 can be adjusted.

Further, in the lighting tool 1B for a vehicle of the embodiment, illuminance of the first light distribution pattern P1 and illuminance of the second light distribution pattern P2 can be variously adjusted by variably adjusting the proportions of the first beam L1 and the second beam L2 divided by the polarization beam splitter 3 using the above-mentioned variable polarization conversion element 8.

In this case, for example, during high speed traveling on an express way or the like, since illuminance of the second light distribution pattern P2 is increased by being adjusted in a direction in which a proportion (light intensity) of the second beam L2 is increased by the variable polarization conversion element 8, the light distribution pattern P having good visibility with respect to a far side can be obtained. Meanwhile, during low speed traveling on a city road or the like, since illuminance of the first light distribution pattern P1 is increased by being adjusted in a direction in which a proportion (light intensity) of the first beam L1 is increased by the variable polarization conversion element 8, the light distribution pattern P having good visibility within a wide range can be obtained.

As described above, in the lighting tool 1B for a vehicle of the embodiment, the same effects as those of the lighting tool 1A for a vehicle can be obtained. That is, the first beam L1 condensed by the first reflector 4 and the second beam L2 condensed by the second reflector 5 can be projected forward by the common projection lens 7. Furthermore, reduction in size of the lighting tool 1B for a vehicle can be achieved by modularizing the first reflector 4, the second reflector 5 and the projection lens 7.

In addition, in the lighting tool 1B for a vehicle of the embodiment, visibility on a side in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1B for a vehicle of the embodiment, further reduction in size of the lighting tool 1B for a vehicle can be achieved by splitting light L' emitted from the light source 2 into the first beam L1 and the second beam L2 using the above-mentioned polarization beam splitter (beam separation element) 3 without increasing the number of the light sources 2 and by using it.

Third Embodiment

Figure 5:
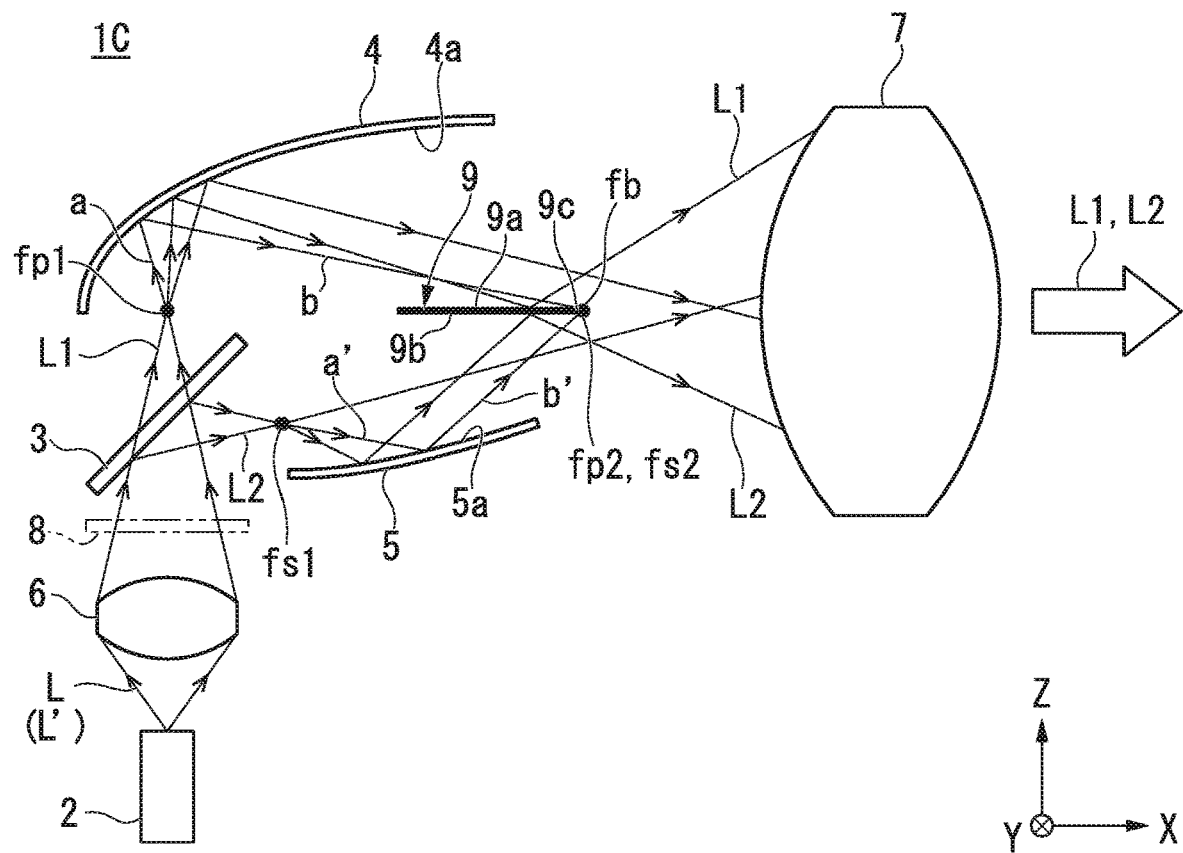
FIG. 5 is a schematic view showing a schematic configuration of a lighting tool for a vehicle according to a third embodiment of the present invention.

Next, for example, a lighting tool 1C for a vehicle shown in FIG. 5 will be described as a third embodiment of the present invention. Further, FIG. 5 is a schematic view showing a schematic configuration of the lighting tool 1C for a vehicle. In addition, in the following description, the same components as those of the lighting tool 1A for a vehicle, descriptions of which are omitted, are designated by the same reference numerals in the drawings.

As shown in FIG. 5, the lighting tool 1C for a vehicle of the embodiment is configured to include a shade 9 configured to block (cut) some of the first beam L1 condensed by a first reflector (a first condensing optical system) 4, in addition to the configuration of the lighting tool 1A for a vehicle.

The shade 9 is constituted by a flat-plate-shaped reflecting member having an upward reflecting surface 9a and a downward reflecting surface 9b. The shade 9 is provided such that a front end 9c thereof is disposed in the vicinity of the rear-side focus fb of the projection lens 7 and extends rearward (in the −X-axis direction).

Figure 6:
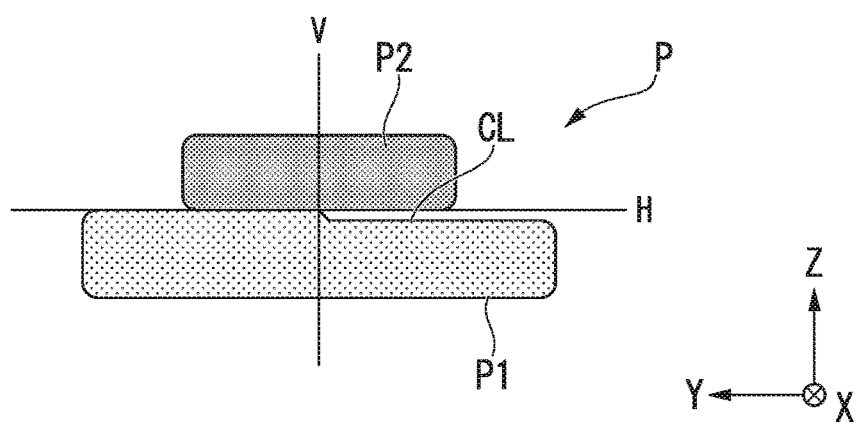
FIG. 6 is a schematic view showing a light distribution pattern formed on a surface of a virtual vertical screen by a first beam and a second beam in the lighting tool for a vehicle shown in FIG. 5.

In the lighting tool 1C for a vehicle having the above-mentioned configuration, the first light distribution pattern P1 due to the first beam L1 and the second light distribution pattern P2 due to the second beam L2 when the first beam L1 and the second beam L2 radiated toward a side in front of the projection lens 7 is projected to the virtual vertical screen facing the projection lens 7 are shown in FIG. 6.

Further, FIG. 6 is a schematic view showing the first light distribution pattern P1 and the second light distribution pattern P2 formed on a surface of the virtual vertical screen by the first beam L1 and the second beam L2 in the lighting tool 1C for a vehicle of the embodiment.

In the lighting tool 1C for a vehicle of the embodiment, like the lighting tool 1A for a vehicle, the first light distribution pattern P1 according to the first condensing magnification M1 is formed by the first beam L1 projected forward from the projection lens 7. Meanwhile, the second light distribution pattern P2 according to the second condensing magnification M2 is formed by the second beam L2 projected forward from the projection lens 7.

In addition, in the lighting tool 1C for a vehicle of the embodiment, an image of the first beam L1 defined by the front end 9c of the shade 9 is inversely projected by the projection lens 7 while blocking some of the first beam L1 reflected by the first reflector 4 using the above-mentioned shade 9. Further, some of the first beam L1 reflected by the first reflector 4 is reflected forward to be inclined upward by the upward reflecting surface 9a of the shade 9, and then, enters the projection lens 7.

Accordingly, the first beam L1 projected forward from the projection lens 7 forms a light distribution pattern for a low beam (a first light distribution pattern P1) including a cutoff line CL on an upper end thereof as a passing beam (a low beam).

Meanwhile, some of the second beam L2 reflected by the second reflector 5 is reflected forward to be inclined downward by the downward reflecting surface 9b of the shade 9, and then, enters the projection lens 7. Accordingly, the second beam L2 projected forward from the projection lens 7 forms a light distribution pattern for a high beam (a second light distribution pattern P2) above the light distribution pattern for a low beam as a traveling beam (a high beam).

Accordingly, a light distribution pattern P in which the light distribution pattern for a high beam (the second light distribution pattern P2) is disposed above the light distribution pattern for a low beam (the first light distribution pattern P1) is formed by the first and second beams L1 and L2 projected forward from the projection lens 7.

Here, in the first beam L1 and the second beam L2 projected from the projection lens 7 toward a road surface, the first beam L1 has more light components of P polarization than light components of S polarization with respect to a road surface, and the second beam L2 has more light components of S polarization than light components of P polarization with respect to a road surface. In this case, the light component (the first beam L1) of P polarization that forms the light distribution pattern for a low beam (the first light distribution pattern P1) can suppress reflection (glare) from the road surface from a relation of a Brewster's angle, for example, even in a circumstance in which a road surface is wet. Accordingly, visibility with respect to the road surface can be increased by the light component (the first beam L1) of P polarization that forms the light distribution pattern for a low beam (the first light distribution pattern P1).

Meanwhile, while the light component (the second beam L2) of S polarization that forms the light distribution pattern for a high beam (the second light distribution pattern P2) is likely to become glare to an oncoming vehicle, since an incidence angle with respect to a front glass of the vehicle is close to a Brewster's angle, reflection becomes larger than usual. Accordingly, it is possible to suppress generation of glare to a low level.

As described above, in the lighting tool 1C for a vehicle of the embodiment, the same effects as those of the lighting tool 1A for a vehicle can be obtained. That is, the first beam L1 condensed by the first reflector 4 and the second beam L2 condensed by the second reflector 5 can be projected forward by the common projection lens 7. Furthermore, reduction in size of the lighting tool 1C for a vehicle can be achieved by modularizing the first reflector 4, the second reflector 5 and the projection lens 7.

In addition, in the lighting tool 1C for a vehicle of the embodiment, visibility on a side in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1C for a vehicle of the embodiment, further reduction in size of the lighting tool 1C for a vehicle can be achieved without increasing the number of the light sources 2 as light L emitted from the light source 2 is divided into the first beam L1 and the second beam L2 using the above-mentioned polarization beam splitter (beam separation element) 3 and used.

In addition, in the lighting tool 1C for a vehicle of the embodiment, the light distribution pattern P in which the light distribution pattern for a high beam (the second light distribution pattern P2) is disposed above the light distribution pattern for a low beam (the first light distribution pattern P1) can be formed using the above-mentioned shade 9.

In addition, in the lighting tool 1C for a vehicle of the embodiment, the same configuration as that of the lighting tool 1B for a vehicle can also be added. That is, the lighting tool 1C for a vehicle of the embodiment may be configured to include the variable polarization conversion element 8 (shown by a broken line in FIG. 5) configured to variably convert a polarization state of light L' emitted from the light source 2.

In this case, since the proportions of the first beam L1 and the second beam L2 divided by the polarization beam splitter 3 can be variably adjusted according to the polarization state of the light L' converted by the variable polarization conversion element 8, switching between the passing beam (the low beam) and the traveling beam (the high beam), which are described above, becomes possible.

For example, when the proportion of the first beam L1 and the second beam L2 is 100%:0%, the light distribution pattern for a low beam (the first light distribution pattern P1) can be formed by the first beam L1 projected forward from the projection lens 7. Meanwhile, when the proportion of the first beam L1 and the second beam L2 is 50%:50%, the light distribution pattern for a low beam (the first light distribution pattern P1) and the light distribution pattern for a high beam (the second light distribution pattern P2) can be formed by the first beam L1 and the second beam L2 projected forward from the projection lens 7. Accordingly, switching between the passing beam (the low beam) and the traveling beam (the high beam) becomes possible.

Fourth Embodiment

Figure 7:
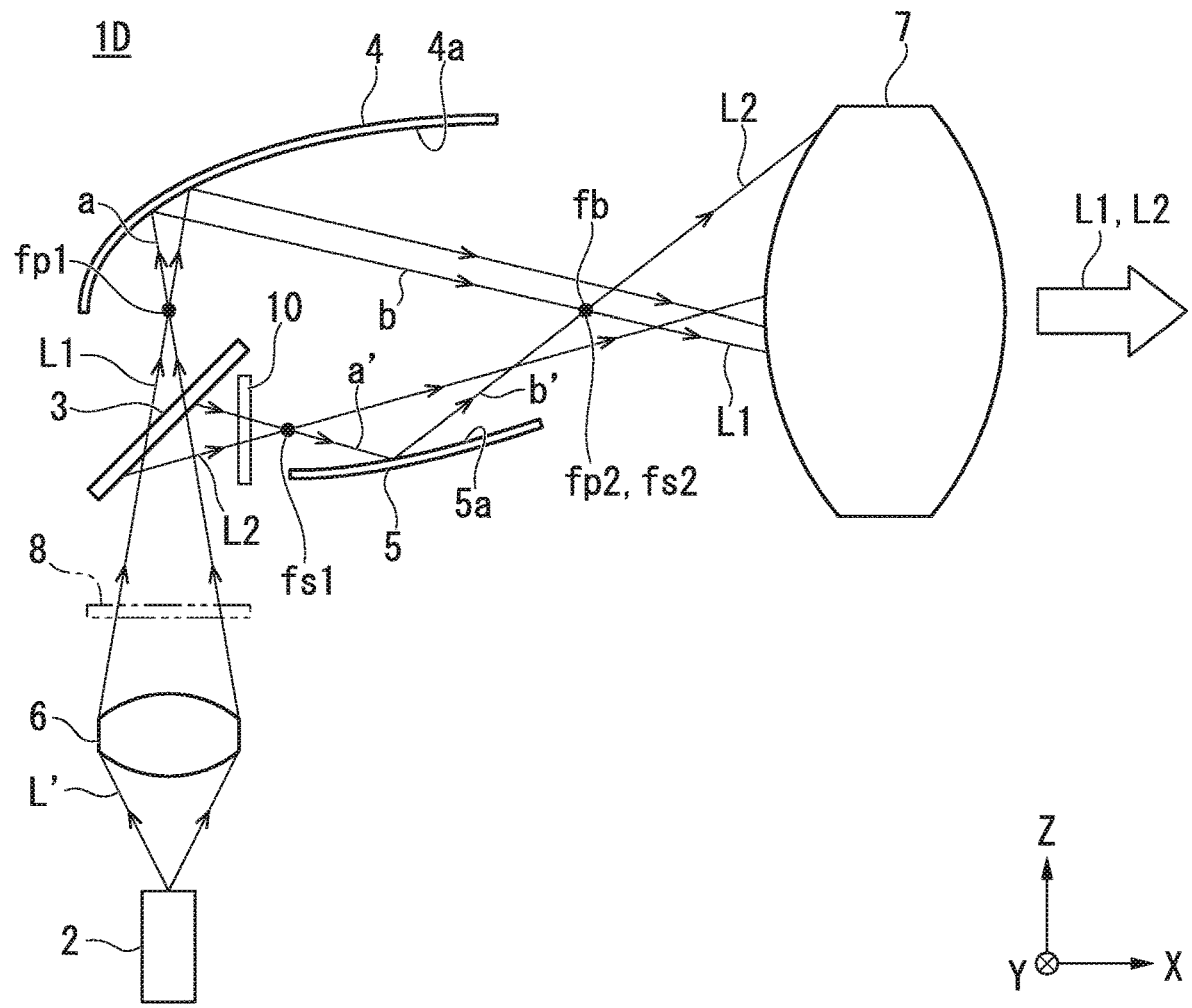
FIG. 7 is a schematic view showing a schematic configuration of a lighting tool for a vehicle according to a fourth embodiment of the present invention.

Next, for example, a lighting tool 1D for a vehicle shown in FIG. 7 will be described as a fourth embodiment of the present invention. Further, FIG. 7 is a schematic view showing a schematic configuration of the lighting tool 1D for a vehicle. In addition, in the following description, the same components as those of the lighting tool 1A for a vehicle, descriptions of which are omitted, are designated by the same reference numerals in the drawings.

As shown in FIG. 7, the lighting tool 1D for a vehicle of the embodiment is configured to include a ½ wavelength plate (a λ/2 plate) 10 configured to convert the second beam L2 into light in the same polarization state as that of the first beam L1, in addition to the configuration of the lighting tool 1A for a vehicle.

The ½ wavelength plate 10 is disposed in the middle of the optical path between the polarization beam splitter 3 and the second reflector 5, and converts the second beam L2 from S polarization to P polarization. Accordingly, it is possible to align (match) the polarization states of the first beam L1 and the second beam L2.

Figure 8:
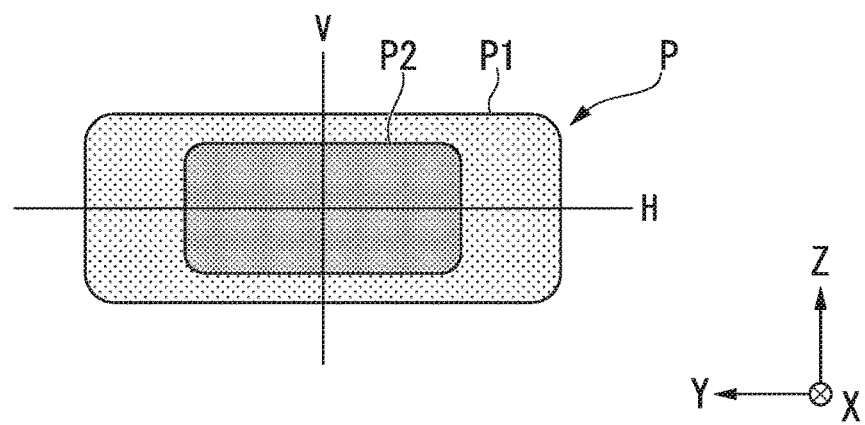
FIG. 8 is a schematic view showing a light distribution pattern formed on a surface of a virtual vertical screen by a first beam and a second beam in the lighting tool for a vehicle shown in FIG. 7.

In the lighting tool 1D for a vehicle having the above-mentioned configuration, the first light distribution pattern P1 due to the first beam L1 and the second light distribution pattern P2 due to the second beam L2 when the first beam L1 and the second beam L2 radiated to a side in front of the projection lens 7 is projected to the virtual vertical screen facing the projection lens 7 are shown in FIG. 8.

Further, FIG. 8 is a schematic view showing the first light distribution pattern P1 and the second light distribution pattern P2 formed on a surface of the virtual vertical screen by the first beam L1 and the second beam L2 in the lighting tool 1D for a vehicle of the embodiment.

In the lighting tool 1D for a vehicle of the embodiment, like the lighting tool 1A for a vehicle, the first light distribution pattern P1 according to the first condensing magnification M1 is formed by the first beam L1 projected forward from the projection lens 7. Meanwhile, the second light distribution pattern P2 according to the second condensing magnification M2 is formed by the second beam L2 projected forward from the projection lens 7. Accordingly, the light distribution pattern P in which the second light distribution pattern P2 projected toward a relatively narrow range is superimposed on an inner side of the first light distribution pattern P1 projected toward a relatively wide range is formed.

Accordingly, in the lighting tool 1D for a vehicle of the embodiment, like the lighting tool 1A for a vehicle, illumination of light radiated to the vicinity of a center of the irradiation range can be increased while widening the irradiation range, and the light distribution pattern P appropriate for the headlight for a vehicle can be obtained.

As described above, in the lighting tool 1D for a vehicle of the embodiment, the same effects as those of the lighting tool 1A for a vehicle can be obtained. That is, the first beam L1 condensed by the first reflector 4 and the second beam L2 condensed by the second reflector 5 can be projected toward a side in front of the common projection lens 7. Furthermore, reduction in size of the lighting tool 1D for a vehicle can be achieved by modularizing the first reflector 4, the second reflector 5 and the projection lens 7.

In addition, in the lighting tool 1D for a vehicle of the embodiment, visibility on a side in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1D for a vehicle of the embodiment, further reduction in size of the lighting tool 1D for a vehicle can be achieved without increasing the number of the light sources 2 as the light L emitted from the light source 2 is divided into the first beam L1 and the second beam L2 using the above-mentioned polarization beam splitter (beam separation element) 3 and used.

In addition, in the lighting tool 1D for a vehicle of the embodiment, for example, when the first beam L1 and the second beam L2 become light of P polarization with respect to a road surface by aligning (matching) the polarization states of the first beam L1 and the second beam L2 using the above-mentioned ½ wavelength plate 10, even in a circumstance in which the road surface is wet, it is possible to suppress reflection (glare) from the road surface from a relation of a Brewster's angle to a low level. Accordingly, visibility with respect to the road surface can be increased by such light (the first beam L1 and the second beam L2) of P polarization.

Fifth Embodiment

Figure 9:
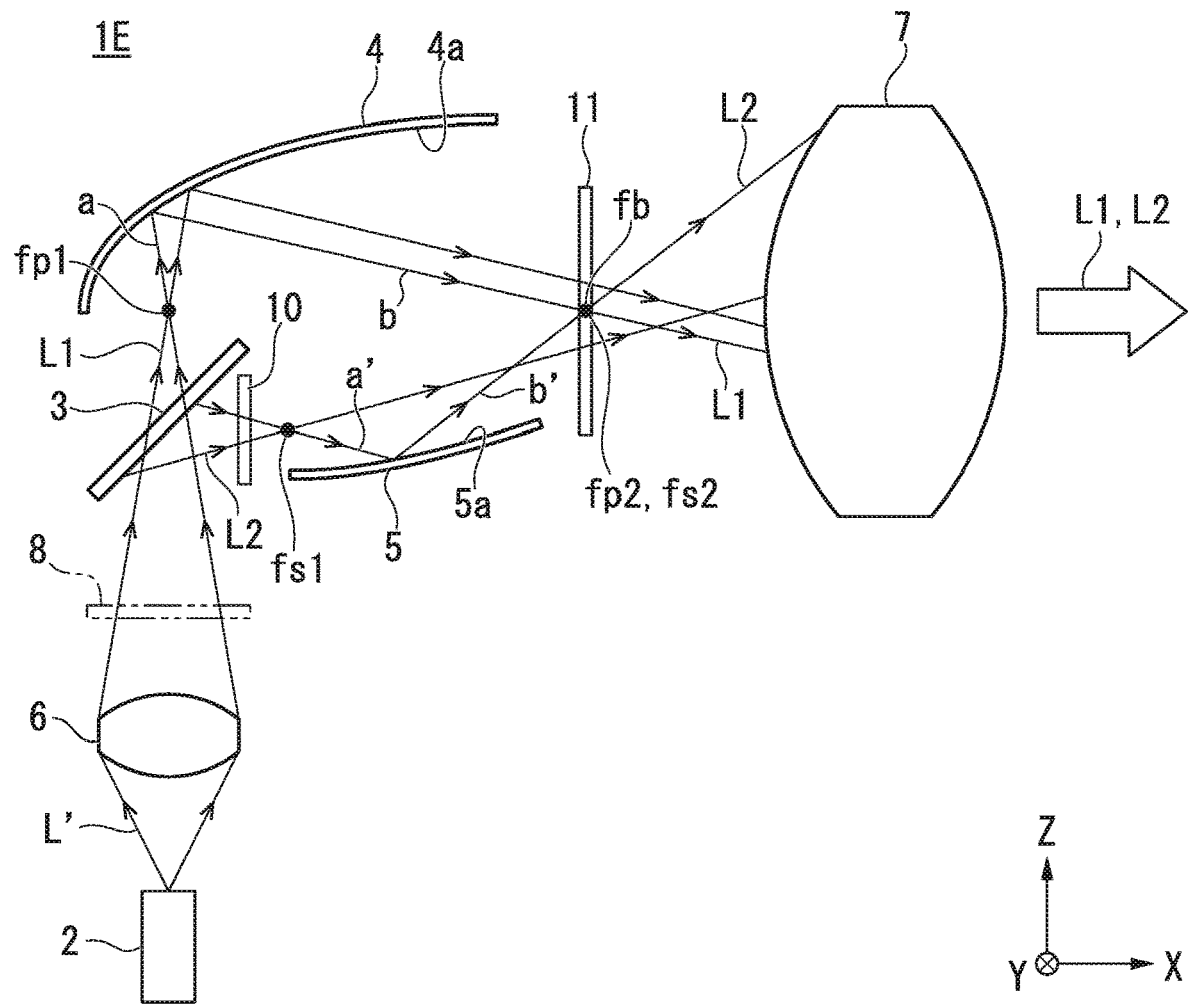
FIG. 9 is a schematic view showing a schematic configuration of a lighting tool for a vehicle according to a fifth embodiment of the present invention.

Next, for example, a lighting tool 1E for a vehicle shown in FIG. 9 will be described as a fifth embodiment of the present invention. Further, FIG. 9 is a schematic view showing a schematic configuration of the lighting tool 1E for a vehicle. In addition, in the following description, the same components as those of the lighting tool 1D for a vehicle, descriptions of which are omitted, are designated by the same reference numerals in the drawings.

As shown in FIG. 9, the lighting tool 1E for a vehicle of the embodiment is configured to include an image forming element 11 configured to form images of the first beam L1 and the second beam L2 projected by the projection lens 7, in addition to the configuration of the lighting tool 1D for a vehicle.

The image forming element 11 is disposed to be matched with the rear-side focus fb of the projection lens 7. For example, a liquid crystal display (LCD) may be used as the image forming element 11. The liquid crystal display may be a segment type or a dot matrix type. In addition, while a transmission type liquid crystal display is used in the embodiment, a reflection type liquid crystal display may be used. In the image forming element 11, a light distribution of the first beam L1 and the second beam L2 projected forward from the projection lens 7 can be variably controlled according to the image formed by the above-mentioned liquid crystal display.

Further, for example, a digital mirror device (DMD) or the like, in addition to the above-mentioned liquid crystal display, may be used in the image forming element 11. In the embodiment, a liquid crystal display having high reliability is used at a relatively low cost. Meanwhile, when the DMD is used, since the light L entering the DMD needs not to be the polarized light L' with which the polarization direction is aligned, the ½ wavelength plate 10 is unnecessary. Further, the polarization beam splitter 3 may be omitted.

Figure 10:
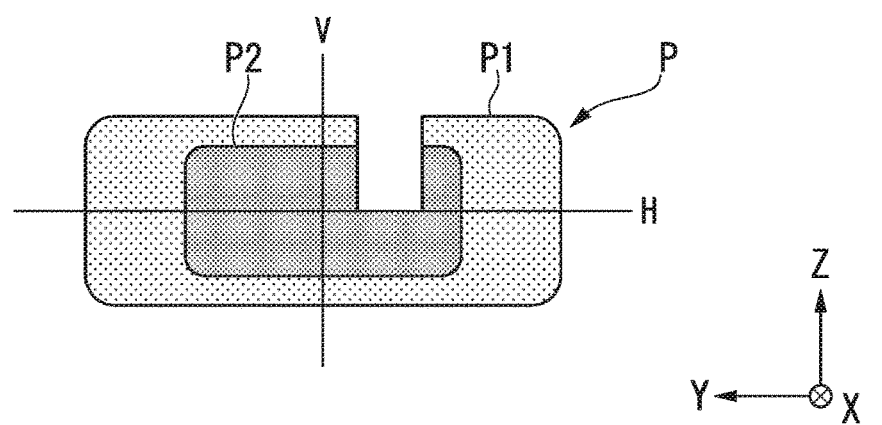
FIG. 10 is a schematic view showing a light distribution pattern formed on a surface of a virtual vertical screen by a first beam and a second beam in the lighting tool for a vehicle shown in FIG. 9.

In the lighting tool 1E for a vehicle having the above-mentioned configuration, the first light distribution pattern P1 due to the first beam L1 and the second light distribution pattern P2 due to the second beam L2 when the first beam L1 and the second beam L2 radiated to a side in front of the projection lens 7 are projected to the virtual vertical screen facing the projection lens 7 are shown in FIG. 10.

Further, FIG. 10 is a schematic view showing the first light distribution pattern P1 and the second light distribution pattern P2 formed on a surface of the virtual vertical screen by the first beam L1 and the second beam L2 in the lighting tool 1E for a vehicle of the embodiment.

In the lighting tool 1E for a vehicle of the embodiment, like the lighting tool 1A for a vehicle, the first light distribution pattern P1 according to the first condensing magnification M1 is formed by the first beam L1 projected forward from the projection lens 7. Meanwhile, the second light distribution pattern P2 according to the second condensing magnification M2 is formed by the second beam L2 projected forward from the projection lens 7. Accordingly, the light distribution pattern P in which the second light distribution pattern P2 projected toward a relatively narrow range is superimposed on an inner side of the first light distribution pattern P1 projected toward a relatively wide range is formed.

Accordingly, in the lighting tool 1E for a vehicle of the embodiment, like the lighting tool 1A for a vehicle, illuminance of light radiated to the vicinity of a center of an irradiation range can be increased while widening the irradiation range, and the light distribution pattern P appropriate for the headlight for a vehicle can be obtained.

In addition, in the lighting tool 1E for a vehicle of the embodiment, a light distribution of the first and second beams L1 and L2 passing through the image forming element 11 is switched according to an image formed by the above-mentioned image forming element 11. Accordingly, the first and second beams L1 and L2 projected forward from the projection lens 7 form a light distribution pattern (the light distribution pattern P) for ADB as a beam for ADB. For example, in the embodiment, a light distribution pattern for ADB that blocks some of the light distribution pattern P (the first and second light distribution patterns P1 and P2) is formed. In addition, a light distribution of the light distribution pattern (the light distribution pattern P) for ADB can be variably controlled by switching the image formed by the image forming element 11.

As described above, in the lighting tool 1E for a vehicle of the embodiment, the same effects as those of the lighting tool 1A for a vehicle can be obtained. That is, the first beam L1 condensed by the first reflector 4 and the second beam L2 condensed by the second reflector 5 can be projected forward by the common projection lens 7. Furthermore, reduction in size of the lighting tool 1E for a vehicle can be achieved by modularizing the first reflector 4, the second reflector 5 and the projection lens 7.

In addition, in the lighting tool 1E for a vehicle of the embodiment, visibility of a side in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1E for a vehicle of the embodiment, further reduction in size of the lighting tool 1E for a vehicle can be achieved without increasing the number of the light sources 2 as the light L emitted from the light source 2 is divided into the first beam L1 and the second beam L2 using the above-mentioned polarization beam splitter (beam separation element) 3 and used.

In addition, in the lighting tool 1E for a vehicle of the embodiment, a light distribution of the light distribution pattern (the light distribution pattern P) for ADB can be variably controlled by switching an image formed by the above-mentioned image forming element 11.

In addition, in the lighting tool 1E for a vehicle of the embodiment, the same configuration as that of the lighting tool 1B for a vehicle may be added. That is, the lighting tool 1E for a vehicle of the embodiment may be configured to include the variable polarization conversion element 8 (shown by a broken line in FIG. 9) configured to variably convert a polarization state of light L' emitted from the light source 2.

In this case, since proportions of the first beam L1 and the second beam L2 divided by the polarization beam splitter 3 can be variably adjusted according to the polarization state of the light L' converted by the variable polarization conversion element 8, illuminance of the first light distribution pattern P1 and illuminance of the second light distribution pattern P2 can be variably adjusted.

Sixth Embodiment

Figure 11:
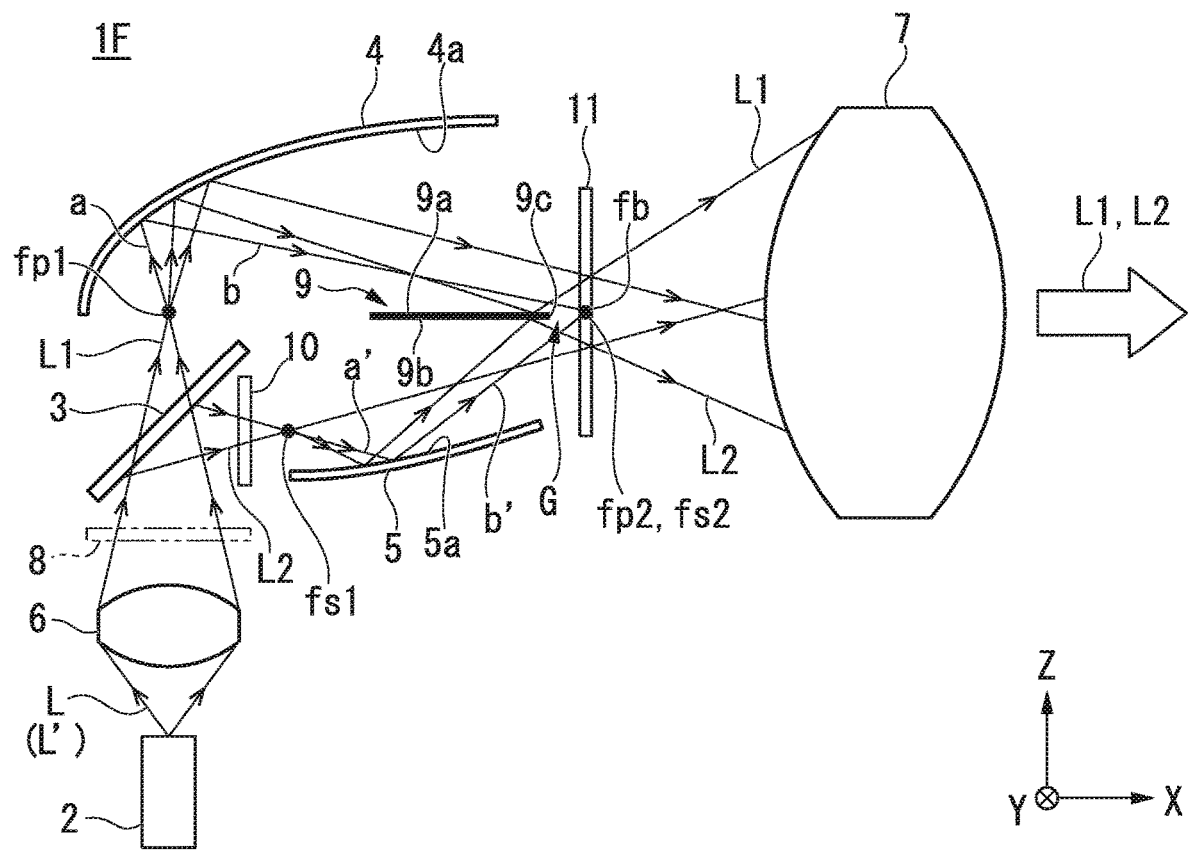
FIG. 11 is a schematic view showing a schematic configuration of a lighting tool for a vehicle according to a sixth embodiment of the present invention.

Next, for example, a lighting tool 1F for a vehicle shown in FIG. 11 will be described as a sixth embodiment of the present invention. Further, FIG. 11 is a schematic view showing a schematic configuration of the lighting tool 1F for a vehicle. In addition, in the following description, the same components as those of the lighting tools 1C, 1D and 1E for a vehicle, descriptions of which are omitted, are designated by the same reference numerals in the drawings.

As shown in FIG. 11, the lighting tool 1F for a vehicle of the embodiment may have a configuration obtained by combining the lighting tools 1C, 1D and 1E for a vehicle. That is, the lighting tool 1F for a vehicle is configured to include the shade 9, the ½ wavelength plate 10 and the image forming element 11, in addition to the configuration of the lighting tool 1A for a vehicle. Among those, the shade 9 is disposed between the front end 9c and the image forming element 11 (the rear-side focus fb of the projection lens 7) with a gap G.

Figure 12:
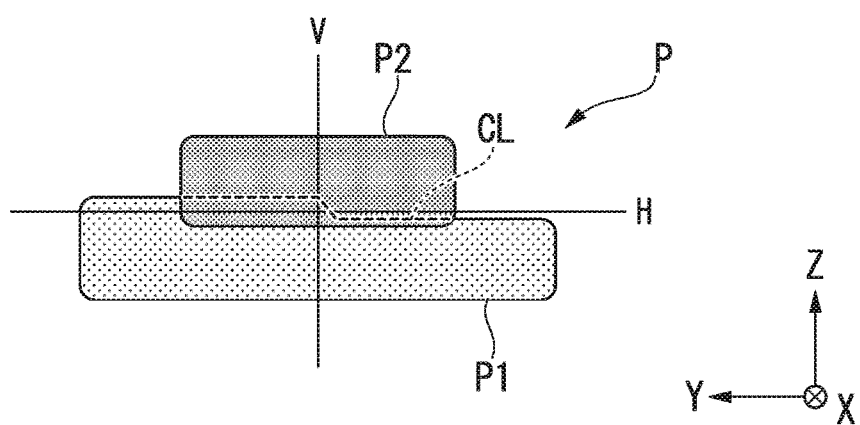
FIG. 12 is a schematic view showing a light distribution pattern formed on a surface of a virtual vertical screen by a first beam and a second beam in the lighting tool for a vehicle shown in FIG. 11.

In the lighting tool 1F for a vehicle having the above-mentioned configuration, the first light distribution pattern P1 due to the first beam L1 and the second light distribution pattern P2 due to the second beam L2 when the first beam L1 and the second beam L2 radiated toward a side in front of the projection lens 7 is projected to the virtual vertical screen facing the projection lens 7 are shown in FIG. 12.

Further, FIG. 12 is a schematic view showing the first light distribution pattern P1 and the second light distribution pattern P2 formed on a surface of the virtual vertical screen by the first beam L1 and the second beam L2 in the lighting tool 1F for a vehicle of the embodiment.

In the lighting tool 1F for a vehicle of the embodiment, like the lighting tool 1A for a vehicle, the first light distribution pattern P1 according to the first condensing magnification M1 is formed by the first beam L1 projected forward from the projection lens 7. Meanwhile, the second light distribution pattern P2 according to the second condensing magnification M2 is formed by the second beam L2 projected forward from the projection lens 7.

In addition, in the lighting tool 1F for a vehicle of the embodiment, an image of the first beam L1 defined by the front end 9c of the shade 9 is inversely projected by the projection lens 7 while blocking some of the first beam L1 reflected by the first reflector 4 using the above-mentioned shade 9. In addition, some of the first beam L1 reflected by the first reflector 4 is reflected forward to be inclined upward by the upward reflecting surface 9a of the shade 9, and then, enters the projection lens 7.

Accordingly, the first beam L1 projected forward from the projection lens 7 forms the light distribution pattern for a low beam (the first light distribution pattern P1) including the cutoff line CL at an upper end as a passing beam (a low beam).

Meanwhile, some of the second beam L2 reflected by the second reflector 5 is reflected forward to be inclined downward by the downward reflecting surface 9b of the shade 9, and then, enters the projection lens 7. Accordingly, the second beam L2 projected forward from the projection lens 7 forms the light distribution pattern for a high beam (the second light distribution pattern P2) above the light distribution pattern for a low beam as a traveling beam (a high beam).

Accordingly, the light distribution pattern P in which the light distribution pattern for a high beam (the second light distribution pattern P2) is disposed above the light distribution pattern for a low beam (the first light distribution pattern P1) is formed by the first and second beams L1 and L2 projected forward from the projection lens 7.

Here, since the shade 9 has a thickness, there is a case in which a dark area (a region that is not irradiated with light) according to the thickness of the shade 9 is generated between the cutoff line CL of the light distribution pattern for a low beam (the first light distribution pattern P1) and the light distribution pattern for a high beam (the second light distribution pattern P2).

Here, in the lighting tool 1F for a vehicle of the embodiment, the above-mentioned gap G is provided between the front end 9c of the shade 9 and the image forming element 11 such that some of the first beam L1 reflected by the first reflector 4 and some of the second beam L2 reflected by the second reflector 5 pass through the gap G. Accordingly, the cutoff line CL of the light distribution pattern for a low beam (the first light distribution pattern P1) and the light distribution pattern for a high beam (the second light distribution pattern P2) can be superimposed on each other in an upward/downward direction, and occurrence of a dark section according to the thickness of the shade 9 can be prevented.

In addition, in the lighting tool 1F for a vehicle of the embodiment, when the front end 9c of the shade 9 is too far from the rear-side focus fb of the projection lens 7, a clear cutoff line CL cannot be formed. With respect to this, an image corresponding to the cutoff line CL is formed using the image forming element 11. Accordingly, the light distribution pattern for a low beam (the first light distribution pattern P1) including the clear cutoff line CL can be formed.

As described above, in the lighting tool 1F for a vehicle of the embodiment, the same effects as those of the lighting tool 1A for a vehicle can be obtained. That is, the first beam L1 condensed by the first reflector 4 and the second beam L2 condensed by the second reflector 5 can be projected forward by the common projection lens 7. Furthermore, reduction in size of the lighting tool 1F for a vehicle can be achieved by modularizing the first reflector 4, the second reflector 5 and the projection lens 7.

In addition, in the lighting tool 1F for a vehicle of the embodiment, visibility of a side in front of the vehicle can be increased by obtaining the light distribution pattern P appropriate for the above-mentioned headlight for a vehicle using the first beam L1 condensed by the first condensing magnification M1 and the second beam L2 condensed by the second condensing magnification M2.

In addition, in the lighting tool 1F for a vehicle of the embodiment, further reduction in size of the lighting tool 1F for a vehicle can be achieved without increasing the number of the light sources 2 as the light L emitted from the light source 2 is divided into the first beam L1 and the second beam L2 using the above-mentioned polarization beam splitter (beam separation element) 3 and used.

In addition, in the lighting tool 1F for a vehicle of the embodiment, a good light distribution pattern P can be formed such that the light distribution pattern for a high beam (the second light distribution pattern P2) is superimposed on the light distribution pattern for a low beam (the first light distribution pattern P1) using the shade 9, the ½ wavelength plate 10 and the image forming element 11, which are described above.

In addition, in the lighting tool 1F of a vehicle of the embodiment, the same configuration as that of the lighting tool 1B for a vehicle may be added. That is, the lighting tool 1F for a vehicle of the embodiment may be configured to include the variable polarization conversion element 8 (shown by a broken line in FIG. 11) configured to variably convert a polarization state of light L' emitted from the light source 2.

In this case, since proportions of the first beam L1 and the second beam L2 divided by the polarization beam splitter 3 can be variably adjusted according to the polarization state of the light L' converted by the variable polarization conversion element 8, illuminance of the first light distribution pattern P1 and illuminance of the second light distribution pattern P2 can be variably adjusted.

Further, the present invention is not limited to the embodiment and various modifications may be made without departing from the scope of the present invention.

For example, while a configuration using the polarization beam splitter 3 as the beam separation element 3 is provided in the embodiment, light L (L') emitted from the light source 2 may be configured to be divided into the first beam L1 and the second beam L2 using a half mirror.

In addition, while a configuration using the first reflector 4 and the second reflector 5 as the first condensing optical system 4 and the second condensing optical system 5 is provided in the embodiment, a configuration of condensing the first beam L1 and the second beam L2 toward a projection lens using at least one or a plurality of lenses may be provided.

In addition, while the first condensing magnification M1 is larger than the second condensing magnification M2 (M1>M2) in the embodiment, on the contrary, the second condensing magnification M2 may be larger than the first condensing magnification M1 (M2>M1). Further, the first condensing magnification M1 and the second condensing magnification M2 may be equal to each other (M1=M2).

In addition, while the light source 2 and the condensing lens (the third condensing optical system) 6 are configured as separate bodies in the embodiment, the light source 2 and the condensing lens (the third condensing optical system) 6 may be configured integrally.

In addition, in the embodiment, a configuration using a collimator lens (a collimator optical system) configured to parallelize the light L (L') emitted from the light source 2 instead of the condensing lens (the third condensing optical system) 6 may be provided. In the case of the configuration, in the first or second reflector 4 or 5, a parabola reflecting surface having a concave surface shape, a cross-sectional shape of which is formed to draw a parabola, may be preferably provided instead of the elliptical reflecting surface 4a or 5b.

Further, while the case in which the present invention is applied to the above-mentioned headlight for a vehicle (headlamp) has been exemplified in the embodiment, the lighting tool for a vehicle to which the present invention is applied is not limited to the lighting tool for a vehicle on the front side, and for example, the present invention may be applied to a lighting tool for a vehicle on the rear side such as a rear combination lamp or the like. In addition, a color of light emitted from the light source is not limited to the above-mentioned white light and may be appropriately changed to red light, orange light, or the like, according to a use of the light source.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:
a light source;
a beam separation element configured to split light emitted from the light source into a first beam and a second beam;
a first condensing optical system configured to condense the first beam at a first condensing magnification;
a second condensing optical system configured to condense the second beam at a second condensing magnification; and
a projection optical system configured to project the first beam and the second beam forward,
wherein each of a condensing point of the first beam condensed by the first condensing optical system and a condensing point of the second beam condensed by the second condensing optical system are adjusted according to a rear-side focus of the projection optical system.

2. The lighting tool for a vehicle according to claim 1, wherein:
the first condensing optical system comprises a first reflector configured to reflect the first beam while condensing the first beam, and
the second condensing optical system comprises a second reflector configured to reflect the second beam while condensing the second beam.

3. The lighting tool for a vehicle according to claim 2, wherein:
the first reflector has a first elliptical reflecting surface,
the second reflector has a second elliptical reflecting surface,
the lighting tool further comprises a third condensing optical system configured to condense the first beam toward a first focus of the first elliptical reflecting surface and to condense the second beam toward a first focus of the second elliptical reflecting surface,
a condensing point of the first beam is disposed at a second focus of the first elliptical reflecting surface and a condensing point of the second beam is disposed at a second focus of the second elliptical reflecting surface, and
the second focus of the first elliptical reflecting surface and the second focus of the second elliptical reflecting surface coincide with each other.

4. The lighting tool for a vehicle according to claim 1, wherein the first condensing magnification is larger than the second condensing magnification.

5. The lighting tool for a vehicle according to claim 1, wherein the beam separation element comprises a polarization beam splitter.

6. The lighting tool for a vehicle according to claim 5, further comprising a ½ wavelength plate disposed in an optical path between the polarization beam splitter and the second condensing optical system and configured to convert the second beam into light of a same polarization state as the first beam.

7. The lighting tool for a vehicle according to claim 1, further comprising an image forming element disposed according to the rear-side focus of the projection optical system and configured to form an image of light projected by the projection optical system.

8. The lighting tool for a vehicle according to claim 1, further comprising a shade configured to block some of the first beam condensed by the first condensing optical system,
wherein a light distribution pattern for a low beam including a cutoff line on an upper end thereof is formed with the projection optical system by inversely projecting an image of light defined by a front end of the shade.

9. The lighting tool for a vehicle according to claim 7, further comprising a shade configured to block some of the first beam condensed by the first condensing optical system,
wherein a gap is provided between a front end of the shade and the image forming element, and a light distribution pattern for a low beam including a cutoff line on an upper end thereof is formed with the projection optical system by inversely projecting an image of light formed by the image forming element.

10. The lighting tool for a vehicle according to claim 8, wherein, among light projected from the projection optical system toward a road surface, the first beam has more light components of P polarization than light components of S polarization with respect to the road surface.

11. The lighting tool for a vehicle according to claim 5, further comprising a polarization conversion element disposed in an optical path between the light source and the polarization beam splitter and configured to convert a polarization state of light emitted from the light source,
wherein a proportion of the first beam and the second beam split by the polarization beam splitter is adjusted according to a polarization state of light converted by the polarization conversion element.

12. The lighting tool for a vehicle according to claim 11, wherein:
the polarization conversion element comprises a variable polarization conversion element configured to variably control a polarization state of light emitted from the light source, and
a proportion of the first beam and the second beam split by the polarization beam splitter is variably adjusted according to a polarization state of light converted by the variable polarization conversion element.

13. The lighting tool for a vehicle according to claim 9, wherein, among light projected from the projection optical system toward a road surface, the first beam has more light components of P polarization than light components of S polarization with respect to the road surface.

14. The lighting tool for a vehicle according to claim 11, wherein the polarization conversion element comprises one of a ½ wavelength plate, a ¼ wavelength plate, and a liquid crystal film.

15. The lighting tool for a vehicle according to claim 11, wherein the variable polarization conversion element is configured to adjust the proportion of the first beam and the second beam split by the polarization beam splitter to be a predetermined proportion by converting the polarization state of light emitted from the light source to one of circular polarization light, elliptical polarization light, and linear polarization light that is reversed from before conversion by the polarization conversion element.

16. The lighting tool for a vehicle according to claim 12, wherein the variable polarization conversion element comprises one of a liquid crystal element and a Faraday element configured to convert a polarization state of light emitted from the light source through electrical control.

17. The lighting tool for a vehicle according to claim 12, wherein:
the variable polarization conversion element is configured to convert light emitted from the light source to elliptical polarization light, and
according to an inclination angle of the elliptical polarization light, the variable polarization conversion element is configured to increase a proportion of the second beam when the vehicle is traveling at high speed and is configured to increase a proportion of the first beam when the vehicle is traveling at low speed.

18. The lighting tool for a vehicle according to claim 15, wherein:
when the proportion of the first beam and the second beam is 100%:0%, the variable polarization conversion element is configured to form a light distribution pattern for a low beam formed by the first beam projected forward from the projection optical system,
when the proportion of the first beam and the second beam is 50%:50%, the variable polarization conversion element is configured to form a light distribution pattern for a low beam and a light distribution pattern for a high beam that are formed by the first beam and the second beam projected forward from the projection optical system, respectively, and
the variable polarization conversion element is configured to switch between the low beam and the high beam.

* * * * *